US 10,518,750 B1

United States Patent
Zhang et al.

(10) Patent No.: US 10,518,750 B1
(45) Date of Patent: Dec. 31, 2019

(54) ANTI-THEFT SYSTEM BY LOCATION PREDICTION BASED ON HEURISTICS AND LEARNING

(71) Applicant: DENSO International America, Inc., Southfield, MI (US)

(72) Inventors: Yu Zhang, Farmington Hills, MI (US); Doua Vang, Waterford, MI (US); Bilal Alasry, Dearborn, MI (US); Vikas Upmanue, Novi, MI (US); Te-ping Kang, Ann Arbor, MI (US); Jordan Necovski, Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/157,863

(22) Filed: Oct. 11, 2018

(51) Int. Cl.
| | |
|---|---|
| *B60R 25/10* | (2013.01) |
| *B60R 25/33* | (2013.01) |
| *G01C 21/34* | (2006.01) |
| *G01C 21/36* | (2006.01) |

(52) U.S. Cl.
CPC .......... *B60R 25/33* (2013.01); *G01C 21/3476* (2013.01); *G01C 21/3484* (2013.01); *G01C 21/3629* (2013.01); *G01C 21/3667* (2013.01); *B60R 2325/205* (2013.01)

(58) Field of Classification Search
CPC .............. B60R 25/33; B60R 2325/205; G01C 21/3476; G01C 21/3484; G01C 21/3629; G01C 21/3667
USPC ...................................................... 340/426.1
See application file for complete search history.

(56) References Cited

U.S. PATENT DOCUMENTS

| | | | |
|---|---|---|---|
| 6,073,062 A * | 6/2000 | Hoshino ................. | B60R 25/04 340/426.22 |
| 6,317,686 B1 * | 11/2001 | Ran ..................... | G01C 21/3691 701/117 |
| 7,233,861 B2 | 6/2007 | Van Buer et al. | |
| 8,738,292 B1 * | 5/2014 | Faaborg ................. | G01C 21/26 701/117 |
| 8,781,716 B1 * | 7/2014 | Wenneman ........ | G01C 21/3484 701/118 |
| 9,127,954 B2 | 9/2015 | Kutomi | |
| 10,026,309 B1 * | 7/2018 | Nepomuceno ......... | G08G 1/166 |
| 10,312,823 B1 * | 6/2019 | Montgomery .......... | H02M 7/44 |
| 2005/0021225 A1 * | 1/2005 | Kantarjiev ........... | G08G 1/0112 701/527 |

(Continued)

FOREIGN PATENT DOCUMENTS

GB         2522733 A         8/2015

*Primary Examiner* — Kerri L McNally
*Assistant Examiner* — Thang D Tran
(74) *Attorney, Agent, or Firm* — Brooks Kushman P.C.

(57) ABSTRACT

A system comprising one or more transceivers configured to communicate data with a communication device of a remote vehicle. The system may also include a processor in communication with the transceiver and programmed to receive data from the communication device indicating a location of the vehicle and data indicating that the vehicle departed prior to a threshold departure time, wherein the threshold departure time is determined in part by data received indicating a category of a point of interest (POI) associated with a location of the vehicle, and send a notification to a mobile device associated with the vehicle when the data indicating that vehicle departed is prior to the threshold departure time.

20 Claims, 4 Drawing Sheets

(56) References Cited

U.S. PATENT DOCUMENTS

| | | | |
|---|---|---|---|
| 2005/0086100 A1* | 4/2005 | Yanagisawa | G01C 21/26 705/13 |
| 2005/0283286 A1* | 12/2005 | Kanda | B60R 16/0232 701/29.6 |
| 2006/0195604 A1 | 8/2006 | Goodman et al. | |
| 2007/0018797 A1* | 1/2007 | Chen | B60R 25/1004 340/425.5 |
| 2007/0038344 A1* | 2/2007 | Oota | B60R 25/2009 701/49 |
| 2008/0193010 A1 | 8/2008 | Eaton et al. | |
| 2008/0300775 A1* | 12/2008 | Habaguchi | G08G 1/096716 701/116 |
| 2009/0098907 A1* | 4/2009 | Huntzicker | G01C 21/12 455/556.1 |
| 2009/0105932 A1* | 4/2009 | Choi | G08G 1/096716 701/117 |
| 2011/0046872 A1* | 2/2011 | Uyeki | G01C 21/3415 701/527 |
| 2011/0184640 A1* | 7/2011 | Coleman | G01C 21/3492 701/533 |
| 2011/0208646 A1* | 8/2011 | McMaster | G06Q 20/10 705/39 |
| 2012/0278886 A1 | 11/2012 | Luna | |
| 2013/0090969 A1* | 4/2013 | Rivere | G06Q 10/06 705/7.19 |
| 2014/0180576 A1* | 6/2014 | LaMarca | G01C 21/3484 701/465 |
| 2014/0302875 A1* | 10/2014 | Beaurepaire | G08G 1/143 455/456.3 |
| 2014/0306817 A1* | 10/2014 | Ricci | H04W 4/21 340/457 |
| 2014/0358437 A1* | 12/2014 | Fletcher | G01C 21/3617 701/533 |
| 2015/0176997 A1* | 6/2015 | Pursche | G08G 1/0967 340/905 |
| 2015/0197151 A1* | 7/2015 | Ballard, Jr. | B60K 28/063 180/272 |
| 2015/0262435 A1* | 9/2015 | Delong | G07C 5/0816 340/439 |
| 2015/0345962 A1* | 12/2015 | Graham | G01C 21/343 701/430 |
| 2016/0061621 A1* | 3/2016 | Hawkins | G01C 21/3629 701/408 |
| 2016/0360382 A1* | 12/2016 | Gross | G06F 3/0488 |
| 2017/0184411 A1* | 6/2017 | Glasgow | G01C 21/3415 |
| 2018/0017404 A1* | 1/2018 | Mendels | G01C 21/3611 |
| 2018/0017405 A1* | 1/2018 | Chen | H04W 4/02 |
| 2018/0357233 A1* | 12/2018 | Daze | H04L 67/36 |
| 2019/0050654 A1* | 2/2019 | Payne-Short | G06K 9/00838 |
| 2019/0132703 A1* | 5/2019 | Ramasamy | G06Q 50/30 |

* cited by examiner

ANTI-THEFT SYSTEM BY LOCATION PREDICTION BASED ON HEURISTICS AND LEARNING

TECHNICAL FIELD

The present disclosure relates to an anti-theft mechanism of a vehicle utilizing a mobile phone of an occupant of the vehicle.

BACKGROUND

In daily operation, a vehicle may be parked at numerous stops throughout the day. Some of the stops are routine stops. For example, a vehicle may be parked home during the night hours, but the vehicle leaves to work during the morning. However, other stops may be sporadic stops that are not schedule. For example, during an errand run, a vehicle may stop at several different locations. A vehicle may be parked at each of those locations for a different duration.

SUMMARY

According to one embodiment, a system comprises one or more transceivers configured to communicate data with a communication device of a remote vehicle. The system may also include a processor in communication with the transceiver and programmed to receive data from the communication device indicating a location of the vehicle and data indicating that the vehicle departed prior to a threshold departure time, wherein the threshold departure time is determined in part by data received indicating a category of a point of interest (POI) associated with a location of the vehicle, and send a notification to a mobile device associated with the vehicle when the data indicating that vehicle departed is prior to the threshold departure time.

According to a second embodiment, a vehicle system in a vehicle comprises a wireless transceiver configured to communicate with a mobile device of an occupant of the vehicle, and a processor in communication with the wireless transceiver and programmed to identify a location of the vehicle utilizing location data, associate a point-of-interest (POI) with the location of the vehicle utilizing the location data, and output a message via a wireless transceiver to the mobile device in response to data indicating that the vehicle departed prior to a threshold departure time associated with the POI, wherein the threshold departure time is determined in part by data indicating a category of the POI.

According to third embodiment, a server comprises a transceiver configured to communicate data with a remote vehicle, and a processor in communication with the transceiver and programmed to send a request to message a mobile device associated with the remote vehicle in response to data received from the remote vehicle indicating that the vehicle departed prior to a threshold departure time associated with a point of interest (POI) associated with a current location of the remote vehicle, wherein the threshold departure time is determined in part by data indicating a category of the POI.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one example embodiment, an anti-theft system may allow drivers to secure their parked cars from theft. The system may provide users with a secure way to protect their vehicle using connectivity, location sensors, and machine learning methods to identify unauthorized use of their vehicle by predicting location and an estimated departure time threshold. Location and early departure time prediction based on machine learning and heuristics may be described below and in the figures.

Figure 1:
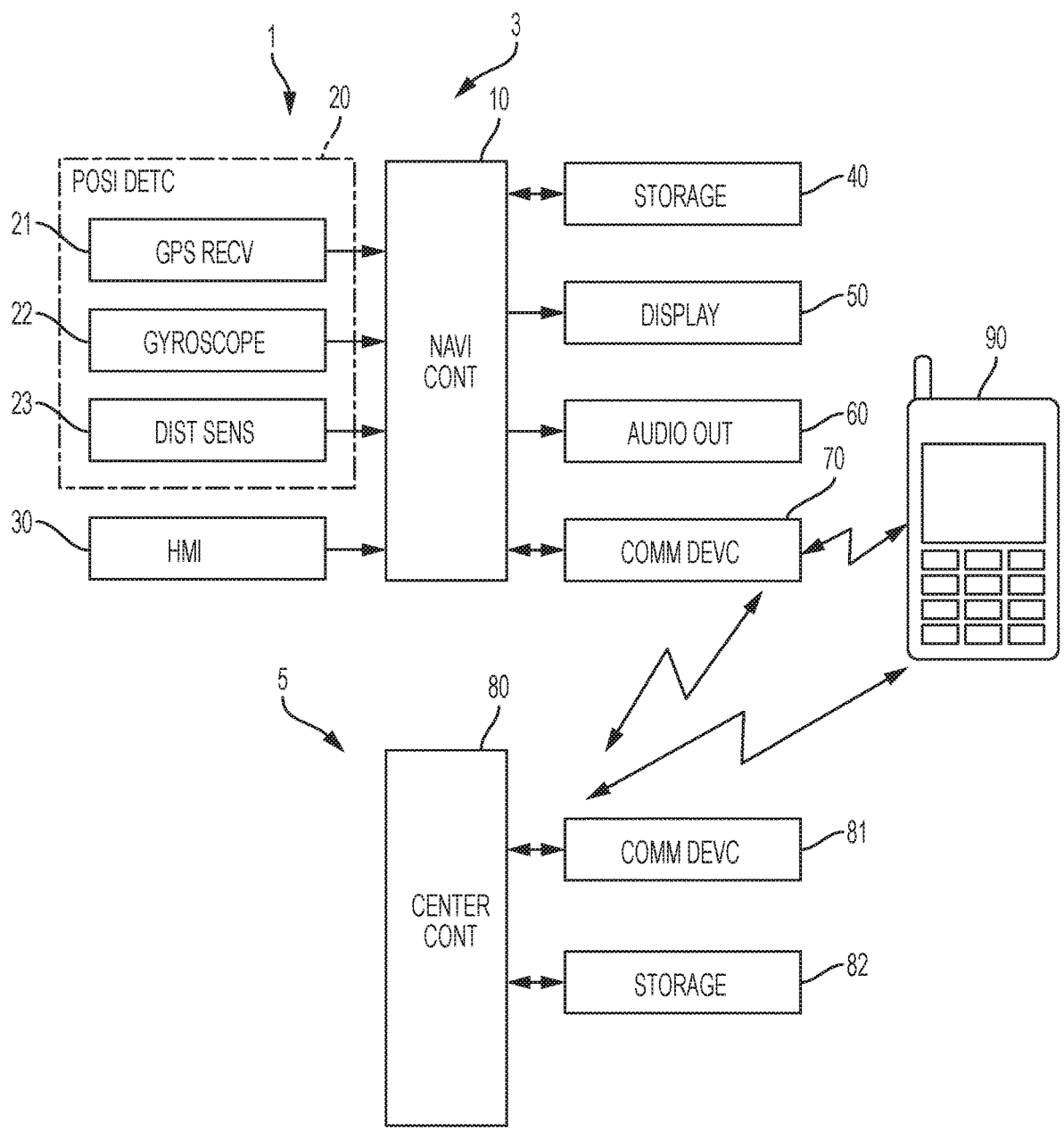
FIG. 1 discloses an overview of a vehicle system.

As shown in FIG. 1, a vehicle system 1 includes a navigation apparatus 3 and a data center 5. The navigation apparatus 3 may be equipped in a vehicle and may include a navigation controller (NAVI CONT) 10 or processor. The navigation apparatus may be a portable terminal, such as a smart phone having a navigation function, other than a device equipped to a vehicle. The navigation apparatus may also be an off-board server or system that processes directions and maneuvers off-board that are to be sent to the vehicle. The route may be calculated using a remote service place and pushed into the vehicle storage. The navigation could be played as audio messages or visual indications (e.g. icons). Local position detectors (either on-board or off-board) may be utilized to match car's position to the route info. The navigation controller 10 may include a microcomputer, which has a central processing unit (CPU), a read only memory (ROM), a random-access memory (RAM), an input/output (I/O) interface and a bus line for coupling the CPU, the ROM, the RAM and the I/O interface. The navigation controller 10 may include a position detector (POSI DETC) 20, a user interface or human machine interface (HMI) 30, a storage 40, a display screen (DISPLAY) 50, an audio output device (AUDIO OUT) 60, and a communication device (COMM DEVC) 70. The position detector 20 may detect a present position of the vehicle. The user interface 30 may be used for inputting a command from a user to the navigation apparatus 3 or vehicle system 1. The storage 40 may store map data. The display screen 50 may display a map and various information to the user. The audio output device 60 may output audio guidance and sounds to occupants of the vehicle. The communication device 70 of the navigation apparatus 3 may communicate with an off-board server 5. Furthermore, the communication device 70 (or another communication device, such as a wireless transceiver as a Bluetooth transceiver), may be utilized to communication with a mobile device 90, such as a mobile phone. The mobile device 90 may be utilized for handsfree communication or other capabilities based on interoperability with the vehicle system 1.

The position detector 20 may receive signals transmitted from satellites for a global positioning system (GPS). The position detector 20 may include a GPS receiver (GPS RECV) 21, a gyroscope (DIST SENS) 22, and a distance sensor (DIST SENS) 23. The GPS receiver 21 may detect a position coordinate and an altitude of the present position of the vehicle. The gyroscope 22 outputs a detection signal corresponding to an angular velocity of a rotational motion applied to the vehicle. The distance sensor 23 outputs a traveling distance of the vehicle. The navigation controller 10 calculates the present position, a direction, and a velocity of the vehicle based on signals output from the GPS receiver 21, the gyroscope 22, and the distance sensor 23. Further, the present position may be calculated in various methods based on the output signal from the GPS receiver 21. For example, a single point positioning method or a relative positioning method may be used to calculate the present position of the vehicle.

The HMI 30 includes a touch panel and may include mechanical key switches. The touch panel is integrally set with the display screen 50 on the display screen or located away from the display such as in front of an arm rest. The mechanical key switches are arranged around the display screen 50. When the navigation apparatus 3 provides a remote control function, operation switches for the remote control function are arranged in the HMI 30. The HMI 30 may also include a voice recognition system that utilizes voice prompts to operate various vehicle functions.

The storage 40, in which the map data is stored, inputs various data included in the map data to the navigation controller 10. The various data includes road data, facility data, point-of-interest (POI) data, address book data, and guidance data. The road data is indicative of a road connection status, and includes node data, which indicates a predetermined position such as an intersection, and link data, which indicates a link that connects adjacent nodes. The facility data is indicative of a facility on the map. The guidance data is used for route guidance. Address book data may be utilized to store custom contacts, locations, and other information (e.g. home or work). POI data may be utilized to identify a POI's location, contact information, category information, review (e.g. Zagat or Yelp) information, etc. Examples of a POI may be a McDonald's under the category of a fast-food restaurant; Starbuck's under coffee shop, a Holiday Inn under the category of hotel, etc. Other POI examples may include, hospitals, dealerships, police stations, cleaners, etc. POIs may be independent business or corporate businesses.

The map data stored in the storage or "cloud" storage may be indicative of a map of an area. The map data is divided into one or more predetermined segment data elements, which are indicative of one or more predetermined segments included in the map of the area. The map data may include information on road names, road geometry, road function class, etc. Furthermore, the map data may include information regarding municipals (county lines, city lines, state lines, country borders, etc.), as well as bodies of water, park's, etc. Map data may also be updated through various processes. Thus, the storage 40 is configured to be rewritable in order to update the mesh data element. For example, a hard disk drive (HDD) and a flash memory may be used as the storage 40.

The display screen 50 may be a color display apparatus having a display surface such as a liquid crystal display. The display screen 50 displays various display windows according to video signal transmitted from the navigation controller 10. Specifically, the display screen 50 displays a map image, a guidance route from a start point to a destination, a mark indicating the present position of the vehicle, and other guidance information. The audio output device 60 may output audible prompts and various audio information to the user. With above-described configuration, the route guidance can be performed by displaying viewable information on the display screen 50 and outputting audible information with the audio output device 60.

The communication device 70 may communication data with the "cloud," for example, a data center 5. Specifically, the navigation apparatus 3 may be wirelessly coupled to a network via the communication device 70 so that the navigation apparatus 3 performs the data communication with the data center 5. The communication device 70 maybe an embedded telematics module or may be a Bluetooth transceiver paired with mobile device 90 utilized to connect to remote servers or the "cloud." The communication device 70 may be both a Bluetooth communication or another form of wireless (or wired) communication.

The server 5, which is remote from the vehicle, mainly includes a data center controller (CENTER CONT) 80. Similar to the navigation controller 10, the data center controller 80 mainly includes a well-known microcomputer, which has a CPU, a ROM, a RAM, an input/output interface and a bus line for coupling the CPU, the ROM, the RAM and the I/O interface. The data center controller 80 includes a communication device (COMM DEVC) 81, a first storage (FIR STORAGE) 82. The communication device 81 of the data center 5 performs the data communication with the navigation apparatus 3. Specifically, the data center 5 is wirelessly coupled to the network via the communication device 81 so that the data center 5 performs the data communication with the navigation apparatus 3.

The off-board server storage 82 inputs the various data into the data center controller 80. The various data may include POI data, the road data, the facility data, and crowd-sourced data (as explained in more detail below). The road data is indicative of a road connection status, and includes node data, which indicates a predetermined position such as an intersection, and link data, which indicates a link that connects adjacent nodes. The facility data is indicative of a facility on the map. The storage may also include point-of-interest (POI) information.

Figure 2:
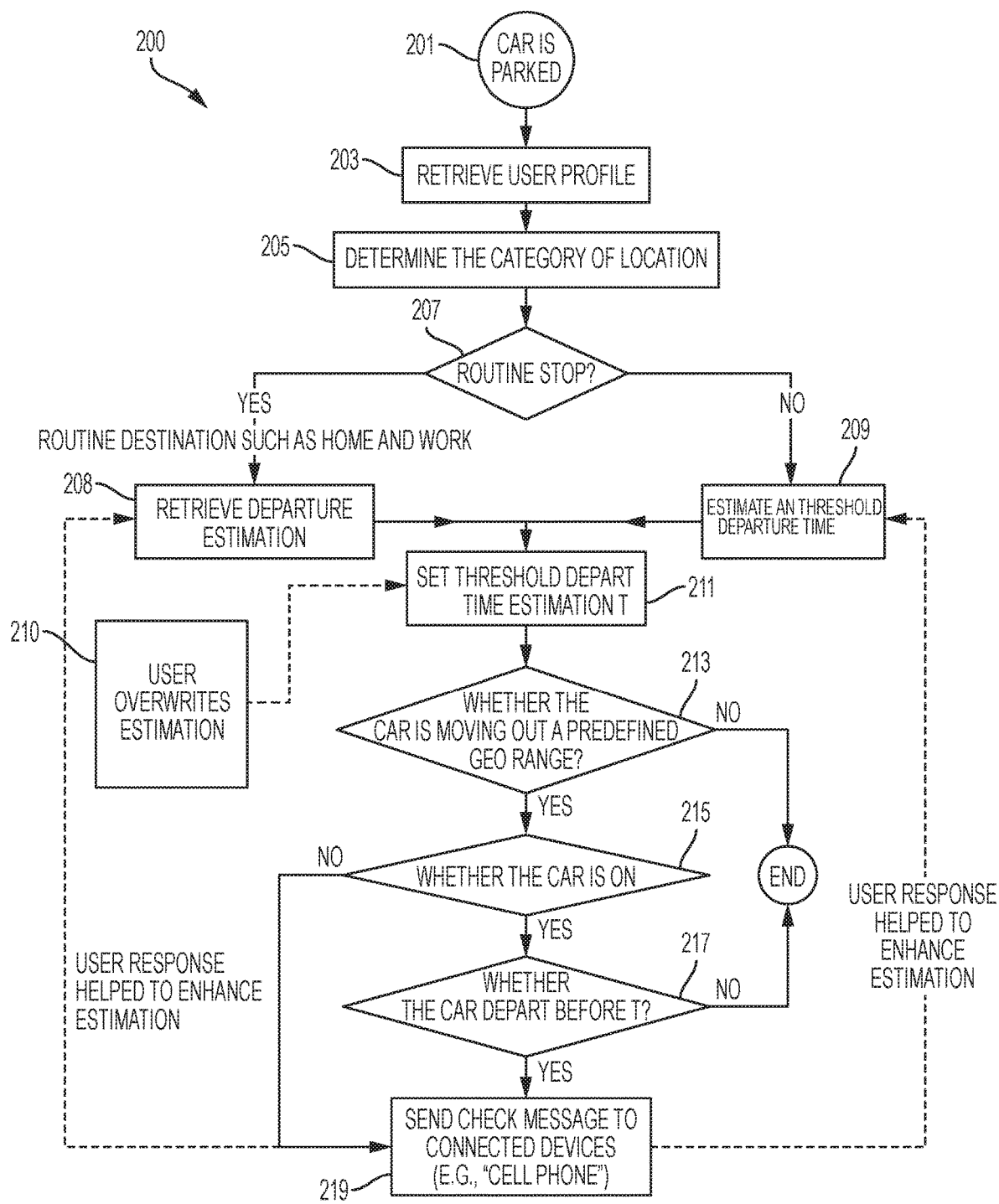
FIG. 2 discloses a flow chart illustrating an embodiment of the anti-theft system by location prediction based on heuristics and learning.

FIG. 2 discloses a flow chart 200 illustrating an embodiment of the anti-theft system by location prediction based on heuristics and learning. The flow chart may be implemented into a process or a vehicle system or an off-board server (e.g. "the cloud".) The anti-theft system may provide users with a secure way to protect vehicle using connectivity, location sensors, and machine learning methods to identify unauthorized use of their vehicle by predicting location and an estimated departure time threshold. At step 201, the vehicle system may determine that a vehicle is parked. The vehicle system may determine that the car is parked based on various sensors or input, such as the ignition switch being turned off while the car's gear is in a "PARK," the emergency brake being activated, the vehicle speed signal indicating zero, the vehicle speed signal indicating zero movement while the vehicle's gear is in "PARK," etc.

Upon the vehicle being parked, the vehicle system may retrieve a user profile at step 203. The user profile may be retrieved from a navigation system or another vehicle system. The user profile may include data regarding a user's preferences, tendencies, historic data, etc. The user profile may be associated with a user automatically based on various vehicle settings (e.g. seat settings) associated with that user, a mobile phone paired with the vehicle associated with the user, a key fob associated with the user, a car-sharing application (e.g. commercial or non-commercial setting). The user may be an owner of the car or a designated driver. The vehicle may also be an autonomous vehicle.

Once a user profile is retrieved, the vehicle system may determine the category of the location that the vehicle is parked at in step 205. For example, the vehicle system may determine whether the vehicle is parked at a home, work, or another category of the POI (e.g. restaurant, gas station, airport, coffee shop, mall, etc.). The vehicle system may utilize the GPS coordinates of the map and compare it to those of nearby POIs. If the GPS coordinates match with a nearby POI, an algorithm of the vehicle processor can identify that the vehicle is parked under the assumption of visiting that POI. Furthermore, the vehicle system may have destination information input by an occupant of the vehicle into a vehicle's navigation system.

Figure 3:
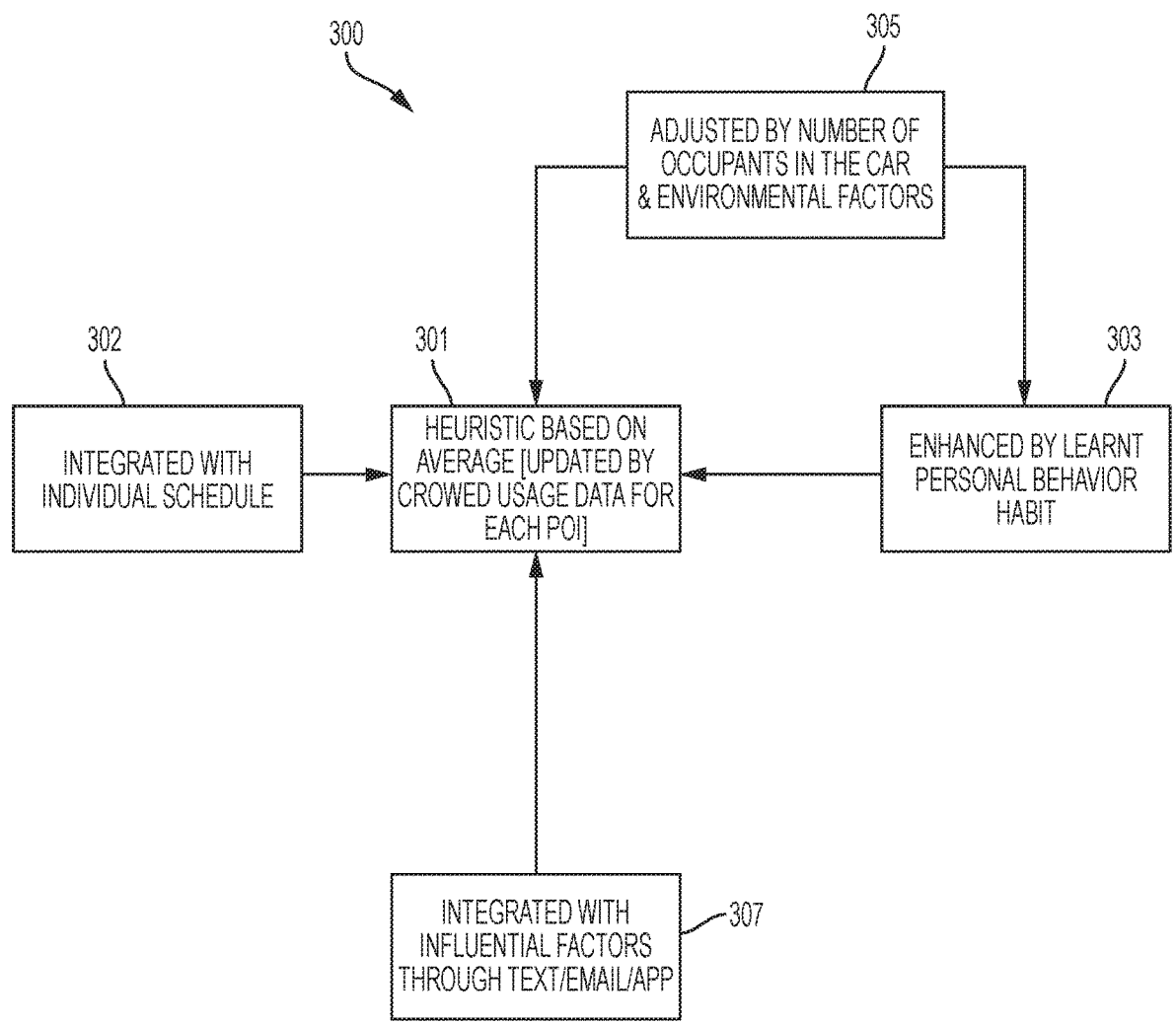
FIG. 3 discloses an algorithm based on heuristics and learning when the parked location of a vehicle is at a POI that is not routine.
Figure 4:
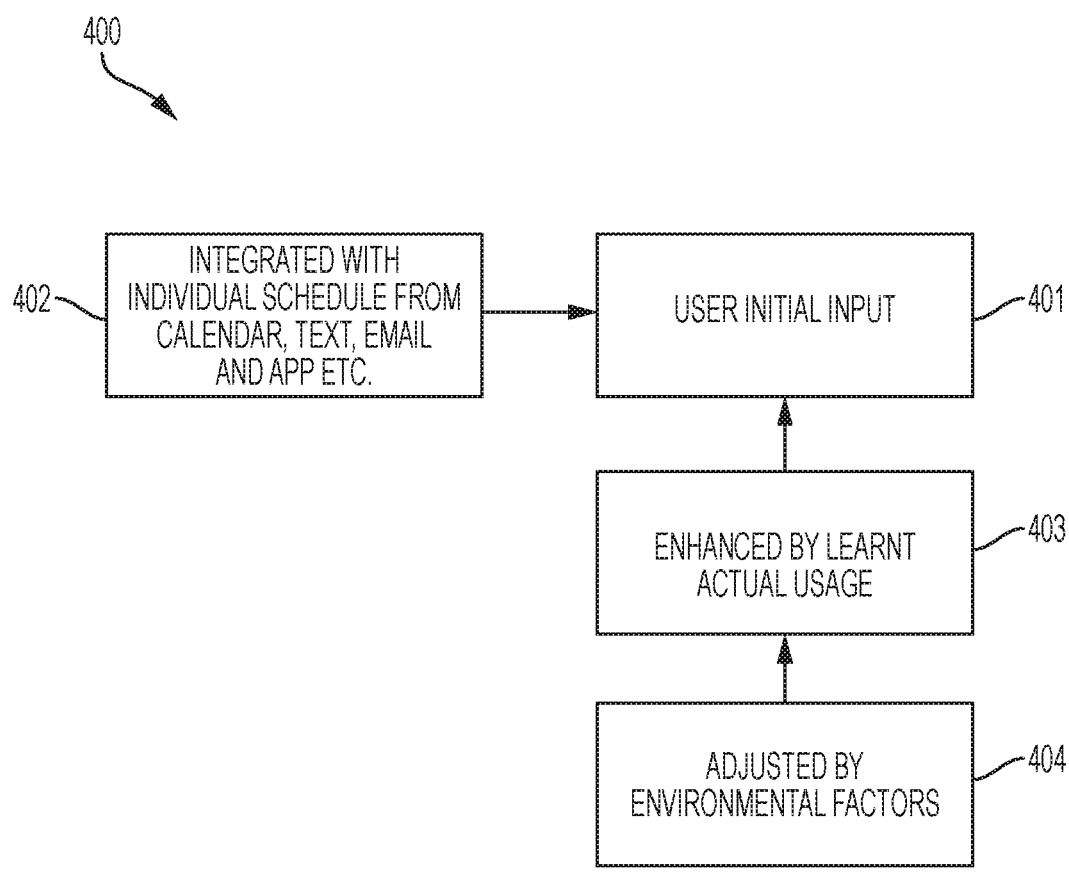
FIG. 4 discloses an algorithm based on heuristics and learning when the parked location of a vehicle is at a POI that is routine.

At step 207, the vehicle system may determine if the parked area or POI is a new stop or non-routine stop of the vehicle. The vehicle system may use the vehicle's coordinates to determine whether the POI is a routine place like home, work, a commonly visited POI, or a new POI. The vehicle system may have historic data of a vehicle's behavior of stopping points based on the user's schedule. For example, the vehicle may identify that the user typically leaves home for an office at 7 AM Monday thru Friday, as well as head home from the office at 6 PM on Monday thru Friday. Additional details regarding whether the parked location is a non-routine POI is shown in FIG. 3, while additional details regarding whether the parked location is a routine POI is shown in FIG. 4.

If the vehicle system determines at step 207 that the stop is a routine stop of the vehicle, the vehicle system may retrieve a departure estimation based on a routine schedule as shown in step 208. For example, the vehicle may be parked at a routine destination such as home or work at step 208. The vehicle's navigation system may have historic data that monitors and tracks the amount of a time a vehicle is parked at a routine stop (e.g. work, home, etc.). Additionally, the vehicle's navigation system may communicate with a mobile device (e.g. phone or tablet) that may also have historic data that monitors and tracks the amount of a time a vehicle is parked at a routine stop. Based on the typical "park" time of the vehicle at the routine stop, the vehicle system may send a threshold departure time (e.g. an estimated stop time or departure time) to send the navigation system. The vehicle system may establish a range or window for the typical departure time that coincides with historic data of the vehicle being parked at the POI.

If it was determined at step 207 that the vehicle is parked at a non-routine POI, the vehicle system may estimate a departure time for a non-routine POI in step 209. The vehicle system may determine a departure time based on a user-prompt requesting an estimated departure time or duration of stop, crowd-sourced data, or other information collected by the vehicle system. For example, the vehicle system may analyze the previous stops of a user by mapping the GPS coordinates of the vehicle compared to the same spots during the same time or day from previous trips. If the vehicle system identifies that the vehicle has no historical pattern of stopping at the GPS coordinates of the vehicle, the vehicle system may assume that the vehicle is stopped at POI that is a non-routine POI. The vehicle may send a user prompt to request a duration of the stop, or the vehicle may collect crowd-sourced data (such as Google Map services) to estimate a duration of the stop. The departure time may be adjusted based upon the various parameters utilized to adjust the estimated departure time for a non-routine POI, as explained in more detail with regards to FIG. 3.

At step 210, the vehicle system may allow a user to overwrite a departure time estimation. For example, a user prompt or menu on a user interface may allow a user to manually set a departure time that is inconsistent with the typical time (as set in either step 208 or step 209). In one example, upon arriving at a destination, an interface of the vehicle may prompt "Your expected departure time is in 45 minutes. Is this accurate?" The user may be allowed to edit the expected departure time by saying or prompting "No" on an interface. As such, if the vehicle is parked at a POI like an airport, the vehicle system may have difficulty estimating the departure time of the vehicle, as there is inconsistency in the estimated departure time based on the historic data. A user prompt may allow an occupant to set an estimated departure time or window of departure. In another example, the user may also overwrite the departure time if the POI. If the user chooses to overwrite the departure time, the vehicle system may set the threshold departure time estimation at step 211. If the user does not overwrite the departure time, the departure time set at steps 208 and 209 may be the same and set at step 211.

At step 213, the vehicle system may determine if the vehicle is moving out a predefined geo range prior to the vehicle being on (e.g ignition is active). This may help identify if the vehicle is being towed or moved without the vehicle being turned on. For example, if the vehicle is turned off, but the GPS module or telematics module is still active, the vehicle system may monitor its GPS position. The vehicle system may constantly check for GPS position for a defined period. In parallel, the vehicle system may define a geo range threshold for the vehicle to move while off that may trigger a notification. For example, the threshold may be set to a ¼ mile radius, ½ mile radius, 1 mile radius, etc. Of course, any geo-range threshold may be defined. The geo-range threshold may be defined based on different location categories (e.g. 200 feet for home). For example, the threshold for certain categories, such as a restaurant, may be higher (e.g. 2 miles) due to onsite valet.

At step 215, the vehicle system may determine if the vehicle is turned on. If the vehicle is not turned on, however, the vehicle is moving (e.g. GPS coordinates keep updating with changed locations), there may be a scenario that the vehicle is towed. However, if the vehicle is on, the system may determine whether the car departed before the estimated departure time that is set for that location or by the occupant. If the vehicle does depart before the threshold departure time ("T"), a check message may be sent to the user's connected devices (e.g. cell phone). The message may state "Your car is moving. Are you driving now?" In another example, the message could be a context-based warning for a natural behavior such as "Are you leaving the game early?" If the vehicle is moving out of a predefined geo range and is not ON, a check message may be sent to the user's connected device as well.

FIG. 3 discloses an algorithm 300 to update or improve the threshold departure time based on heuristics and learning when the parked location of a vehicle is a POI that may not be routine stop (e.g. non-routine POI). At a high-level, the algorithm may utilize various inputs to adjust an estimated departure time for a vehicle when the vehicle stops at a non-routine POI. The data may be onboard the vehicle, on a device owned by a user, or off-board server. At 301, the flowchart shows all of the individual inputs that may be input to create a heuristic based on an average of the departure time or time spent at a location. In other words, the crowd source information may be utilized to determine how long a visitor may typically visit that specific POI or the category of that POI at a specific time of day or day of the week. The heuristic based on an average may be updated by crowd-sourced usage data for each POI. For example, there may be data associate with average length of time for each POI. Additional inputs to the model may allow the vehicle system to adjust each POI departure time accordingly. For example, if the user has an upcoming appointment and is at a POI that they normally spend a long time at, the model may update to determine a shorten departure time. The system may simultaneously integrate heuristics based on averages (e.g. updated by crowd usage data for each POI). A remote server may maintain such information on the averages of the specific POI or category of the POI and provide such data to the vehicle for updating. Examples of an early departure time might be leaving a movie theater in less than 90 minutes, a grocery store in less than 20 minutes, a restaurant in less than 30 minutes, and a mall in less than an hour.

The vehicle system may integrate with an individual schedule of user or occupant of the vehicle at 302. For example, the user's calendar may include an appointment, gathering, data, class, training session, etc. Such examples may be input to the heuristic based average to accommodate a departure time for a non-routine POI that is stopped at. In one example, the vehicle may stop at a non-routine POI, such as a library at 2 PM. If the vehicle system is aware that a doctor appointment exists for the driver/occupant at 3 PM, and the estimated driving time to the doctor is 15 minutes, the vehicle system utilize the appointment to accommodate the departure time. The calendar may be imported by the user through the mobile device or through connectivity to an off-board server (e.g. "the cloud"). The schedule data may be then utilize to update the averages.

The heuristic average may utilize personal behavior habits by aggregating user response data 303. Examples of the personal habits may include dining time, coffee time, and shopping time. The personal habit data may be utilized to adjust the departure time of the vehicle. For example, if the vehicle system knows that the user is having coffee time or dining or shopping, the estimated departure time may be increased from the original estimation. Such factors may be utilized to update the heuristic average for a specific POI or the category of the POI.

Another input may be adjusting the departure time of the vehicle based upon the number of occupants in the car or environmental factors 305. For example, the number of occupants in the vehicle may account for adjusting of a POI that has been visited. The vehicle system may work with sensors in the vehicle to identify the number of occupants. For example, a seat sensor may be utilized to measure weight of a passenger and can identify when a user is seated. In another example, the vehicle system may utilize a Bluetooth transceiver or other wireless transceiver to identify various connected devices that may be owned by occupants (e.g. connecting to multiple phones may mean multiple occupants in the vehicle). For example, if multiple children are identified by a seat sensor, the duration for a visit to a barber/salon may be updated to be longer than typical average. Furthermore, environmental factors may also be utilized to updated the averages. For example, traffic data may be retrieved from an off-board server to provide additional data to update the averages. Additionally, weather data may be retrieved from an off-board server to provide additional data to update the averages. For example, it may be determined that times or traffic or bad weather lead to prolonged stays. Thus, the environmental data may be utilized to extend and update a departure time.

Another input may be adjusting the departure time of the vehicle based upon social-media factors 307. Such social media factors may include scheduling of an online-order/cub-side pick up from an application, identification of a shopping list (e.g. examining the length of it), identification of a carry-out order, parking time reservations, purchased event ticket, etc. Thus, the vehicle may utilize these social factors to adjust an average duration at the POI based on such social-media factors. For example, if curb-side ordering is utilized and data indicating such is shared between the mobile phone and vehicle system, that data may be utilized to shorten a duration since the curb-side pickup would be very short. Furthermore, if data indicates than a purchased ticket event for 5 hours takes place (e.g. concert), the average may be updated to reflect the ticketed event.

FIG. 4 discloses an algorithm 400 for an estimated departure time threshold based on heuristics and learning when the parked location of a vehicle is a POI that is a routine stop (e.g. home, work, routine errand stop, etc.). At a high-level, the algorithm may initially utilize various user's initial inputs to identify an estimated departure time. For example, a user interface (e.g. human machine interface or HMI) may prompt a user at a stop and request a user to enter an estimated duration. For example, a voice recognition system may ask "How long do you plan to stay at this stop?" and the user's response may define the attribute. However, through additional visits to the routine POI, the averages may rely less on an occupants input and rely on contextual data gathered through the car.

The vehicle system may integrate with an individual schedule of user or occupant of the vehicle 402 to adjust the heuristics and learning for a parked location. For example, the user's calendar may include a meeting, business travel plan, paid-time off, vacation plan, sick days, etc. Such examples may be input to the heuristic based average to accommodate a departure time for a routine POI that the vehicle has stopped at. In one example, the vehicle may stop at a routine POI, such as a place-of-work at 8 AM. If the vehicle system is aware that a doctor appointment exists for the driver/occupant at 3 PM, and the estimated driving time to the doctor is 15 minutes, the vehicle system utilizes the appointment to accommodate the departure time from a typical work schedule.

The vehicle system may also improve accuracy based on actual usage at a routine POI 403. For example, the vehicle system may calculate an average of the duration that the vehicle has stopped at home for a given duration (e.g. day of the week, time, etc.). The heuristic average may utilize personal behavior habits by aggregating user response data 403. Examples of the personal habits may include dining time, coffee time, and shopping time, work time, resting time, etc. The personal habit data may be utilized to adjust the departure time of the vehicle. For example, if the vehicle system knows that the user is traveling to work based on a consistent pattern of leaving and returning to home during a work week. As the vehicle is stopped at the POI more frequently, the vehicle system may utilize the user response data to further adjust the average duration.

The vehicle system may also improve accuracy based on environmental factors 404. For example, traffic data may be retrieved from an off-board server to provide additional data to update the averages. Additionally, weather data may be retrieved from an off-board server to provide additional data to update the averages. For example, it may be determined that times or traffic or bad weather lead to prolonged stays. Thus, the environmental data may be utilized to extend and update a departure time.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
    one or more transceivers configured to communicate data with a communication device of a remote vehicle; and
    a processor in communication with the transceiver and programmed to:
    receive data from the communication device indicating a location of the remote vehicle and data indicating that the remote vehicle departed prior to a threshold departure time, wherein the threshold departure time is determined in part by data received indicating a category of a point of interest (POI) associated with a location of the remote vehicle and a routine departure time of the remote vehicle at the POI; and
    send a notification to a mobile device belonging to a driver of the remote vehicle and associated with the remote vehicle, when the data indicating that the remote vehicle departed is prior to the threshold departure time that is not the routine departure time of the remote vehicle at the POI.

2. The system of claim 1, wherein the threshold departure time is determined in part by data indicating a duration that the POI is visited by other vehicles.

3. The system of claim 1, wherein the threshold departure time is determined in part by data indicating a duration that the POI is visited by the remote vehicle.

4. The system of claim 1, wherein the threshold departure time is determined in part by data input from an occupant of the remote vehicle.

5. The system of claim 1, wherein the processor is further programmed to receive user profile information from the vehicle that identifies a user of the remote vehicle, and the threshold departure time is determined in part by the user profile information.

6. The system of claim 5, wherein the user profile information is obtained from the mobile device or key fob associated with the remote vehicle.

7. The system of claim 1, wherein the communication device is a mobile phone or an on-board wireless transceiver.

8. The system of claim 1, wherein the threshold departure time is determined in part by data received from the remote vehicle indicating a number of occupants of the remote vehicle.

9. The system of claim 1, wherein the category of the POI indicates that the POI is a routine stop for the vehicle.

10. The system of claim 1, wherein the category of the POI indicates that the POI is a non-routine stop for the remote vehicle.

11. A vehicle system in a vehicle, comprising:
    a wireless transceiver configured to communicate with a remote mobile device of an occupant of the vehicle; and
    a processor in communication with the wireless transceiver and programmed to:
    a. identify a location of the vehicle utilizing location data;
    b. associate a point-of-interest (POI) with the location of the vehicle utilizing the location data; and
    c. output a message via the wireless transceiver to the remote mobile device in response to data indicating that the vehicle departed prior to a threshold departure time associated with the POI that is not a routine departure time of the vehicle at the POI, wherein the threshold departure time is determined in part by data indicating a category of the POI and the routine departure time of the vehicle at the POI.

12. The vehicle system of claim 11, wherein the threshold departure time is determined in party by input from an occupant of the vehicle.

13. The vehicle system of claim 11, wherein the category of the POI indicates that the POI is a routine stop for the vehicle.

14. The vehicle system of claim 13, wherein the threshold departure time is determined in part by historical data indicating an average duration of the vehicle at the POI.

15. The vehicle system of claim 11, wherein the category of the POI indicates that the POI is a non-routine stop for the vehicle.

16. The vehicle system of claim 15, wherein the threshold departure time is determined in part by crowd-sourced data indicating an average duration of other vehicles at the POI.

17. The vehicle system of claim 15, wherein the threshold departure time is determined in part by crowd-sourced data indicating an average duration of other vehicles at the category of the POI.

18. The vehicle system of claim 11, wherein output of the message is in response to data indicating the vehicle being turned on.

19. The vehicle system of claim 11, wherein output of the message is in response to data indicating the vehicle being turned off.

20. A server, comprising:
    a transceiver configured to communicate data with a remote vehicle; and
    a processor in communication with the transceiver and programmed to send a request to message a mobile device associated with the remote vehicle in response to data received from the remote vehicle indicating that the remote vehicle departed prior to a threshold departure time associated with a point of interest (POI) associated with a current location of the remote vehicle, wherein the threshold departure time is determined in part by data indicating a category of the POI and a routine departure time of the remote vehicle at POI.

\* \* \* \* \*